United States Patent [19]  [11] 4,308,205
Battisti et al.  [45] Dec. 29, 1981

[54] WATER-SOLUBLE MONOAZO CATIONIC DYESTUFFS DERIVED FROM 1-PHENYL-3-AMINOPYRAZOLES

[75] Inventors: Ruggero Battisti; Nicola Mazzaferro, both of Novara; Giovanni Bausani, Trecate (Novara), all of Italy

[73] Assignee: Montedison S.p.A., Milan, Italy

[21] Appl. No.: 852,060

[22] Filed: Nov. 16, 1977

[30] Foreign Application Priority Data

Nov. 17, 1976 [IT] Italy ................................ 29422 A/76

[51] Int. Cl.$^3$ ....................... C09B 29/22; C09B 29/36
[52] U.S. Cl. ..................................... 260/163; 260/147; 260/162
[58] Field of Search ........................ 260/162, 163, 147

[56] References Cited

U.S. PATENT DOCUMENTS 2,972,508 2/1961 Kruckenberg et al. ........ 260/163 X
3,515,715 6/1970 Straley et al. ........................ 260/163

FOREIGN PATENT DOCUMENTS 2239445 3/1973 Fed. Rep. of Germany ...... 260/163
1392581 2/1965 France ................................. 260/162
1392645 2/1965 France ................................. 260/162
1086994 10/1967 United Kingdom ................ 260/163

Primary Examiner—John F. Niebling

[57] ABSTRACT

A new class of water-soluble monoazo cationic dyestuffs free from sulphonic or carboxylic acid groups is disclosed. A process for preparing the new dyestuffs, which are derived from 1-phenyl-3-aminopyrazoles, is also disclosed.

1 Claim, No Drawings

WATER-SOLUBLE MONOAZO CATIONIC DYESTUFFS DERIVED FROM 1-PHENYL-3-AMINOPYRAZOLES

THE PRIOR ART

Dyestuffs derived from pyrazoles generically have been described. However, so far as is known to applicants, the present dyestuffs derived from 3-aminopyrazole have not been described heretofore.

THE PRESENT INVENTION

An object of this invention is to provide a new class of pyrazole dyestuffs particularly suitable for dyeing and printing polyester or polyamide fibers modified by acid groups, and especially fibers based on polymers and copolymers of acrylonitrile.

Another object is to provide a method for preparing the new dyestuffs.

These and other objects are accomplished by the invention, which provides dyestuffs corresponding to general formula (I):

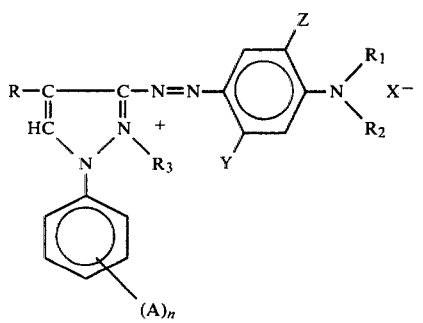

wherein:

R is H or $CH_3$;

$R_1$ is alkyl, hydroxyalkyl, alkoxyalkyl, acyloxyalkyl, or cyanoalkyl; having on the aggregate up to 7 carbon atoms;

$R_2$ is alkyl, hydroxyalkyl, alkoxyalkyl, acyloxyalkyl or cyanoalkyl, having on the aggregate up to 7 carbon atoms, or aralkyl;

$R_3$ is $CH_3$ or $C_2H_5$;

Y is H, alkyl having up to 4 carbon atoms, a halogen, or an acylamino group;

Z is H or alkoxyl having up to 4 carbon atoms;

A is H, halogen, or alkyl or alkoxyl having up to 4 carbon atoms, or $CF_3$;

n is 1 or 2; and

X is a monovalent anion.

The dyestuffs of formula (I) are obtained by alkylation of the intermediate compounds having the following general formula (II):

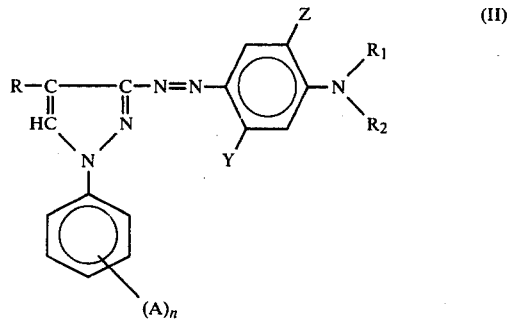

wherein R, $R_1$, $R_2$, Y, Z, A and n have the same meanings as in formula (I) using substantially conventional techniques. The intermediates of formula (II) are new per se, have themselves the characteristics of dyestuffs, and are within the scope of this invention.

The intermediates (II) are alkylated by treatment with an alkylating agent in a suitable solvent. Suitable alkylating agents include alkyl halides, alkylarylsulphonates, and alkyl sulphates, in particular those in which the alkyl group is methyl or ethyl.

Aromatic hydrocarbons, optionally halogenated, (such as toluene, xylenes, chlorobenzene, o-dichlorobenzene), dimethylformamide, carbon tetrachloride, etc., are useful as inert organic solvent in the alkylation step. An excess of the alkylating agent can also be used as the solvent.

The alkylation is generally conducted at a temperature comprised between 80° and about 140° C., optionally under pressure, consistently, however, with the stability of the quaternary dyestuff obtained. The course of the alkylation is generally followed through chromatography on a thin layer.

The cationic dyestuff is generally separated by simple filtration of the final alkylation mass wherein it is contained as an insoluble or only slightly soluble precipitate. The separation can also be effected, in some cases, by elimination of the solvent at reduced pressure or by distillation in a vapor stream, according to techniques which are known generally. The dyestuffs can be purified by simple washing with solvents or by dissolution in water, with removal of the insoluble impurities by filtration.

The dyestuffs can then be precipitated from the aqueous solutions thereof by addition of appropriate salts, for instance, sodium chloride and zinc chloride or chlorozincates, again according to techniques known, in general.

Anion X does not affect the color and can be varied, for example in order to improve the dyestuff solubility. Such anions are, for example, chlorine, bromine, iodine, phosphate anion, sulphate anion, alkylphosphate anion, arylsulphonate anion, or a complex anion such as trichlorozincate anion.

The intermediate of formula (II) can be prepared according to substantially conventional methods, by diazotization of 1-phenyl-3-aminopyrazole of formula (III):

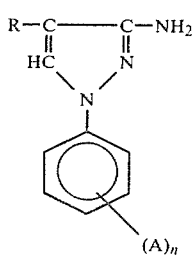

(III)

and successive coupling in an acid medium with a substituted aniline of formula (IV):

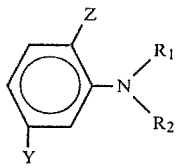

wherein R, $R_1$, $R_2$, Y, Z, A and n have the same meanings as specified herein.

1-phenyl-3-aminopyrazoles (III) are known products and can be prepared by conventional methods: for example, when R=H and A=H, by condensation of phenyl-hydrazine with acrylonitrile to obtain 1-phenyl-3-amino-2-pyrazoline and successive dehydrogenation of the latter to give 1-phenyl-3-aminopyrazole.

The compounds of formula (III) include, for example, 1-(m-chlorophenyl)-3-aminopyrazole. The anilines of formula (IV) include, for example, N-methyl-N-benzylaniline and N,N-diethylaniline.

The dyestuffs of the invention when applied by usual dyeing methods to polyester or polyamide fibers modified by acid groups, and especially to fibers comprising polymers or copolymers of acrylonitrile, provide pure, bright dyeings which exhibit excellent stability, in particular to sunlight. By "fibers" as used herein is meant fibers in any form, including yarns and fabrics comprising said fibers.

The following examples are given to illustrate the invention in more detail and are not intended to be limiting.

EXAMPLE 1

3.87 g (0.02 mole) of 1-(m-chlorophenyl)-3-aminopyrazole were dissolved in 100 ml of $H_2O$ containing 47 g of 22° Bé HCl and were diazotized at a temperature ranging from 0° to 5° C. with a solution of 1.5 g of $NaNO_2$ in 5 ml of $H_2O$. At the conclusion of diazotization, the nitrite in excess was eliminated by means of sulphamic acid. The solution of the resulting diazo compound was dropped into a solution, cooled to 5°–10° C., composed of 3.94 g (0.02 mole) of N-methyl-N-benzylaniline, 200 ml of $H_2O$ and 12 g of HCl at 22° Bé. On completion of the diazo addition, sodium acetate was added gradually to bring the pH to about 5. It was filtered, washed with water and dried, thus obtaining 7.75 g of an intermediate of formula (II), wherein R=Y=Z=H; $R_1$=$CH_3$; $R_2$=$CH_2C_6H_5$; A=Cl, n=1;

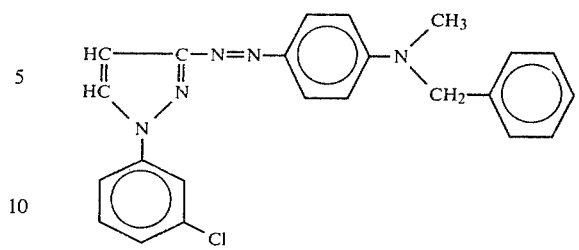

in the form of a yellow powder having a melting point of 134°–135° C., and the following centesimal analysis:

| calculated values for $C_{23}H_{20}ClN_5$: | C = 68.74%, H = 4.98%, N = 17.43%; |
|---|---|
| found values: | C = 68.26%, H = 4.97%, N = 17.22%. |

For the conversion to (quaternized) alkylated product, 7.75 g of said intermediate were heated for 2 hours to 100° C. in 55 ml of chlorobenzene with 14 g of dimethylsulphate, until disappearance of the dispersed dye.

Chlorobenzene was removed under vacuum and the residue was diluted with water and filtered. From the solution the dye was precipitated by addition of NaCl and $ZnCl_2$. It was filtered and dried, thus obtaining 7.2 g of a cationic dyestuff of formula:

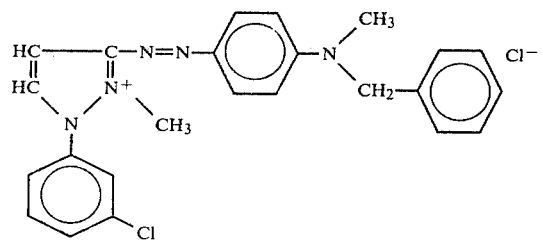

in the form of a red-violet powder.

EXAMPLE 2 (Dyeing Example)

1 g of dyestuff prepared according to Example 1 was kneaded with 2 g of 50% acetic acid and dissolved in hot water up to a total volume of 5 l. 1 g of crystallized sodium acetate was added to the dyeing bath, and 100 g of a previously scoured polyacrylonitrile yarn were introduced at 60° C. The bath temperature was brought very gradually to 100° C., and the yarn was dyed for 1 hour under boiling. After gradual cooling to 60° C., it was washed with water, soaped at 70° C. for 10 minutes with a solution of a non-ionic detergent at 0.1%, rinsed with water and dried. The dyeing so obtained was uniform and exhibited a pure, bright red shade with excellent stability to sunlight, sublimation, solvents and wet treatments.

EXAMPLE 3

Following the modalities described in Example 1, 3.87 g (0.02 mole) of 1-(m-chlorophenyl)-3-aminopyrazole were diazotized and coupled with 2.98 g (0.02 mole) of N,N-diethylaniline.

7 g of an intermediate of formula (II) were thus obtained wherein R=Y=Z=H; $R_1=R_2=C_2H_5$; A=Cl; n=1:

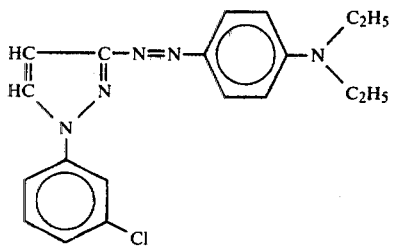

in the form of a yellow powder having a melting point of 138°–139° C. and the following centesimal analysis:

| | | |
|---|---|---|
| calculated values for $C_{19}H_{20}ClN_5$: | C = | 64.50%, |
| | H = | 5.66%, |
| | N = | 19.80%, |
| found values: | C = | 64.75%, |
| | H = | 5.86%, |
| | N = | 19.89%. |

For the conversion to the alkylated product, 7 g of said intermediate were heated for 4 hours to 100° C. with 18 g of dimethylsulphate, until disappearance of the dispersed dye. The reaction mass was poured into 500 ml of $H_2O$, whereupon it was filtered. The dye was precipitated from the solution by addition of NaCl and $ZnCl_2$ and, after filtration and drying, 7.5 g of a cationic dyestuff having the formula:

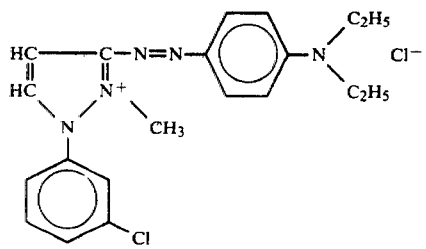

were obtained in the form of a red-violet powder. The dyestuff, applied to a polyacrylonitrile yarn according to the modalities of Example 2, produced a uniform and bright bluish red shade, that exhibited excellent stabilities to sunlight, sublimation, solvents and wet treatments.

By operating according to the foregoing Examples, dyes were prepared and dyeings were obtained that exhibited the characteristics reported in the following table.

| Ex. | Dyestuff | Shade on polyacrylonitrile |
|---|---|---|
| 4 | (structure with $CH_2CH_2CN$, $C_2H_5$, $CH_3$, phenyl) | Red |
| 5 | (structure with $CH_2CH_2CN$, $C_2H_5$, $CH_3$, 3-Cl-phenyl) | Red |
| 6 | (structure with $C_2H_5$, $C_2H_5$, $CH_3$, 4-Cl-phenyl) | Red |
| 7 | (structure with $C_2H_5$, $C_2H_5$, $CH_3$, 2-Cl-phenyl) | Red |
| 8 | (structure with $CH_3$, $CH_2$-phenyl, $CH_3$, phenyl) | Red |
| 9 | (structure with $C_2H_5$, $C_2H_5$, $CH_3$, 4-$OCH_3$-phenyl) | Red |
| 10 | (structure with $C_2H_5$, $C_2H_5$, $CH_3$, 3-$CF_3$-phenyl) | Red |

| Ex. | Dyestuff | Shade on polyacrylonitrile |
|---|---|---|
| 11 | (structure with C₂H₅, CH₃, CH₂—CH₂—CN, 2,4-dichlorophenyl) | Red |
| 12 | (structure with C₂H₅, C₂H₅, NHCOCH₃, CH₃, phenyl) | Orange |

What we claim is:

1. Water-soluble monoazo cationic dyestuffs, free from sulphonic or carboxylic acid groups, and having the general formula:

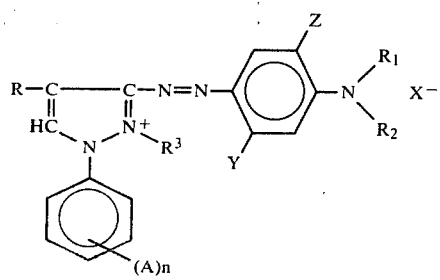

wherein:
R is H;
$R_1$ is alkyl, hydroxyalkyl, alkoxyalkyl, acyloxyalkyl or cyanoalkyl, having on the aggregate up to 7 carbon atoms;
$R_2$ is alkyl, hydroxyalkyl, alkoxyalkyl, acyloxyalkyl or cyanoalkyl, having on the aggregate up to 7 carbon atoms, or aralkyl;
$R_3$ is $CH_3$ or $C_2H_5$;
Y is H, alkyl having up to 4 carbon atoms, a halogen, or an acylamino group;
Z is H, or alkoxyl having up to 4 carbon atoms;
A is H, halogen, alkyl or alkoxyl having up to 4 carbon atoms, or $CF_3$;
n is 1 or 2; and
X is a monovalent anion.

* * * * *